(12) United States Patent
Jhaveri et al.

(10) Patent No.: US 10,277,549 B2
(45) Date of Patent: Apr. 30, 2019

(54) PRIORITIZED EMAIL SYNCHRONIZATION WITH SERVER

(71) Applicant: Apple Inc., Cupertino, CA (US)

(72) Inventors: Neil V. Jhaveri, San Jose, CA (US); Gregory B. Vaughan, Santa Cruz, CA (US); Ian W. Anderson, San Jose, CA (US); Jackson J. Gardner, San Jose, CA (US); Phillip T. Tao, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 14/811,116

(22) Filed: Jul. 28, 2015

(65) Prior Publication Data

US 2016/0359786 A1    Dec. 8, 2016

Related U.S. Application Data

(60) Provisional application No. 62/171,006, filed on Jun. 4, 2015.

(51) Int. Cl.
*H04L 12/58* (2006.01)
*H04L 29/06* (2006.01)
*H04L 29/08* (2006.01)

(52) U.S. Cl.
CPC ............ *H04L 51/22* (2013.01); *H04L 51/066* (2013.01); *H04L 51/26* (2013.01); *H04L 67/2842* (2013.01); *H04L 67/42* (2013.01)

(58) Field of Classification Search
CPC ......... H04L 51/22; H04L 51/26; H04L 67/42; H04L 51/066; H04L 67/2842

USPC .................................................. 709/204–206
See application file for complete search history.

(56) References Cited

U.S. PATENT DOCUMENTS

| | | | |
|---|---|---|---|
| 8,713,124 B1 | 4/2014 | Weiss | |
| 8,843,452 B2 * | 9/2014 | Baessler | G06Q 10/107 707/665 |
| 2004/0133644 A1 * | 7/2004 | Warren | H04L 69/08 709/206 |
| 2005/0039048 A1 | 2/2005 | Tosey | |
| 2007/0238440 A1 * | 10/2007 | Sengupta | G06F 1/3209 455/343.2 |

(Continued)

OTHER PUBLICATIONS

Microsoft "EmailTray," free product download information, Jun. 24, 2012, [online], [retrieved from the internet], <URL: http://download.cnet.com/EmailTray/3000-2367_4-10967364.html>, 3 pages.

*Primary Examiner* — Chris Parry
*Assistant Examiner* — Weiwei Y Stiltner
(74) *Attorney, Agent, or Firm* — Kilpatrick Townsend & Stockton

(57) ABSTRACT

E-mail synchronization may involve synchronization of data types, such as a unique identifier (UID), flag, header, and content. Upon identifying a trigger (e.g., user input) to receive a plurality of messages, a client device an implement an optimized retrieval scheme. This retrieval scheme may involve retrieval of multiple data types (e.g., UIDs, flag(s), and text) for one group of messages before those data types are retrieved for other groups of messages. Retrieval schemes can be determined and dynamically adjusted based on user input so as to provide quicker retrieval of certain data of certain messages. Retrieval schemes can also be optimized when multiple mailboxes are present.

19 Claims, 8 Drawing Sheets

(56) References Cited

U.S. PATENT DOCUMENTS

| | | | |
|---|---|---|---|
| 2011/0086613 A1* | 4/2011 | Doudkine | G06Q 10/107 455/410 |
| 2013/0060865 A1* | 3/2013 | Reddy K V | H04L 51/12 709/206 |
| 2013/0157624 A1* | 6/2013 | Talwar | H04W 4/14 455/412.1 |
| 2013/0166664 A1 | 6/2013 | May et al. | |
| 2014/0173006 A1* | 6/2014 | Mikami | H04L 51/26 709/206 |
| 2014/0280635 A1* | 9/2014 | Bengochea | H04L 51/22 709/206 |
| 2015/0235166 A1* | 8/2015 | Brady | G06Q 10/083 705/330 |
| 2015/0261832 A1* | 9/2015 | Sinha | G06F 17/30554 715/751 |
| 2016/0088115 A1* | 3/2016 | Agnew | H04L 67/2842 709/206 |
| 2017/0026328 A1* | 1/2017 | Adkins | H04L 51/12 |

* cited by examiner

FIG. 5

PRIORITIZED EMAIL SYNCHRONIZATION WITH SERVER

CROSS-REFERENCE TO RELATED APPLICATION

The present application claims the benefit of and priority to U.S. Provisional Application No. 62/171,006, filed Jun. 4, 2015, the entire contents of which is incorporated herein by reference for all purposes.

BACKGROUND

Users can retrieve e-mail messages from various mailboxes on their device. For example, a user may have one or more e-mail accounts with different account providers, such as an employer, an e-mail service provider, and the like. Under the ubiquitous Internet Message Access Protocol (IMAP) for retrieving e-mail messages, a message may comprise a Unique Identifier (UID), one or more flags, a header, and a content part (text and/or attachment).

One of the disadvantages of existing retrieval schemes is that they do not account for user experience and a likely immediate need of a user. Existing methods are slow from the perspective of a user. For example, once a user initiates a synchronization process on a mailbox, it may take a significant amount of time (e.g., tens of second to minutes) before the user is presented with a screen of useful information about messages in one of the user's mailboxes.

BRIEF SUMMARY

Embodiments provide systems, methods, and apparatuses for prioritized retrieval of messages at a client device from a message server as part of a synchronization process. In some embodiments, upon identifying a trigger (e.g., user input) to receive a plurality of messages, an optimized retrieval scheme can be implemented. This retrieval scheme may involve retrieval of multiple data types (e.g., UIDs, flag(s), and text) for one group of messages before those data types are retrieved for other groups of messages.

According to some embodiments, the client device may transmit a first request to the server based on the retrieval scheme, the first request being for the unique identifiers and the headers of a first set of the plurality of messages. This first set may be determined based on several factors (e.g., considering user experience and current user interactions with a messaging application) and may comprise any number of messages. The client device may then receive, from the server, the unique identifiers and the headers of the first set. A second request can be sent to the server for at least a portion of the content for one or more of the messages of the first set. Once the portion of content is received, a user of the client device may be able to view relevant messages before information of other messages is received. Such a prioritized scheme can provide relevant message information to a user quicker.

In embodiments where a user has multiple mailboxes configured on a client device, a synchronization process may identify a highest priority mailbox. A first thread on the client device may retrieve initial information from the highest priority mailbox, e.g., using a prioritized retrieval scheme. The highest priority mailbox may be one that is synchronized first, at least partially. This initial information may comprise a total count and a count of unread messages in the mailbox, as well as content information for an initial set of messages. Following the retrieval of the initial information, several threads may run in parallel to obtain information from a plurality of mailboxes.

Other embodiments provide various methods of using a second device in the synchronization process. Such methods may involve utilizing a first network connection to receive messages at a first device, and then having that first device provide an alert to a server that a new message has been received. The server can then push a notification to a second device, thereby allowing the second device to be synchronized, but without having the second device expend power determining whether a new message has been received.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 5 shows one example of a retrieval scheme in a multiple mailbox scenario that may be improved by embodiments of the present invention.

DETAILED DESCRIPTION

Figure 1:
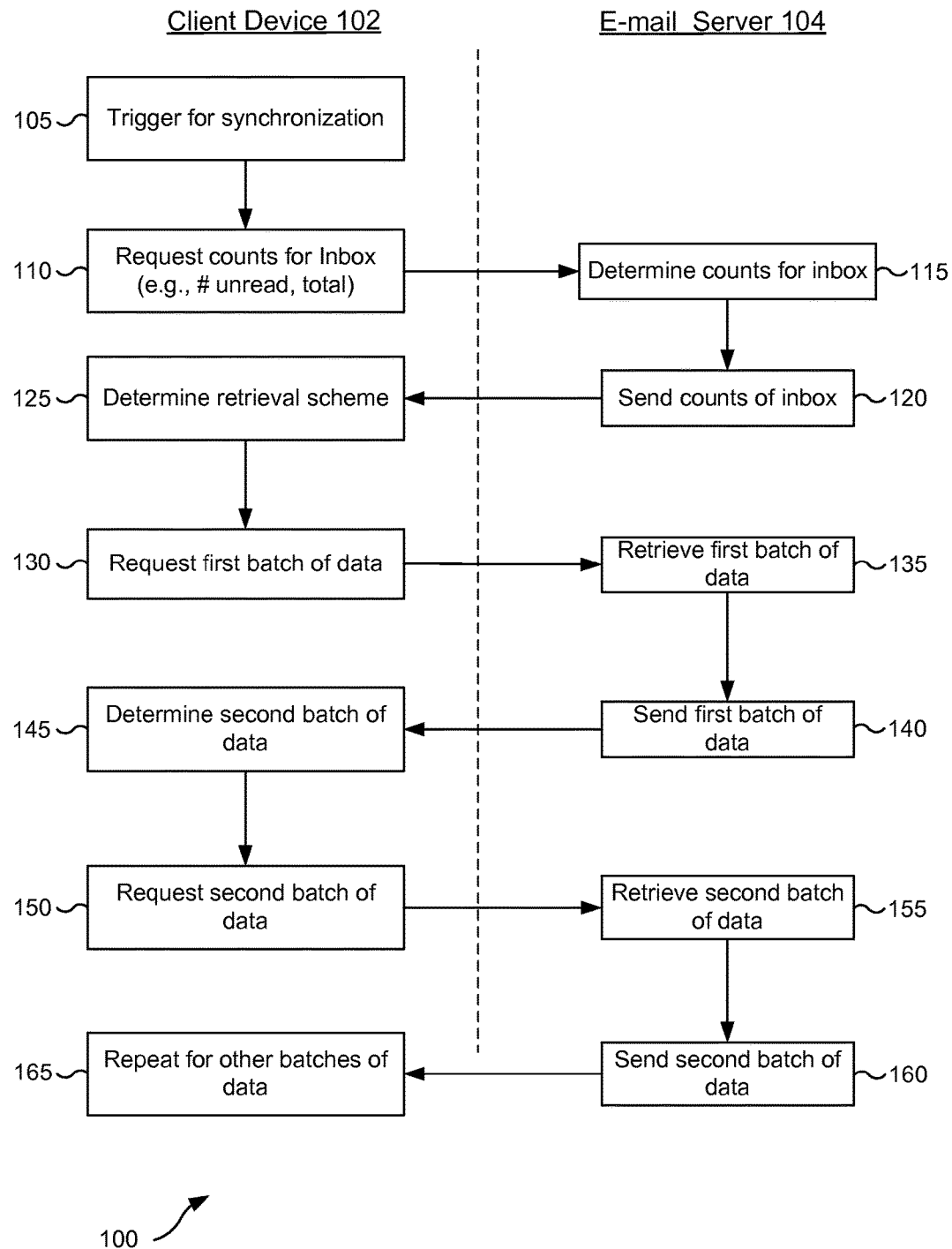
FIG. 1 is a block diagram illustrating an example synchronization process between a client device and an e-mail server according to embodiments of the present invention.

The process of synchronizing a user's mailbox on a client device account involves retrieving messages from a message server, such as an e-mail server. Various approaches may be used to complete this synchronization process. Even in situations where the cost of two such approaches is eventually the same in terms of total amount of resources used or total time, the user-visible responsiveness can be markedly different based on the sequence of operations in each approach. Especially in a situation where a user of the client device continually interacts with or monitors the client device during the synchronization process, retrieval schemes can impact the perceived speed of the process.

In some embodiments utilizing an optimized retrieval scheme, several messages are presented to the user on a display with previews (also called snippets) within a relatively short period of time. Whereas at that same point in time, a scheme that has not been optimized, for example, would not have previews for any of the displayed messages. Thus, in an optimized scheme, the most interesting and important information can be presented to the user first.

Embodiments can prioritize retrieval of specific sets of data of particular messages (e.g., e-mails) to provide quick access to a user. For example, identifiers and any flags for one or more initial groups of messages can be requested, along with their headers before requesting the identifiers, flags, and headers of other messages. Further, some content (e.g., text) of specific messages of the initial group(s) can be retrieved before other messages of the initial group(s). In some implementations, attachments of the messages of the initial group(s) can be retrieved at later times. In this manner, data of messages most likely to be viewed initially by a user can be obtained before messages that are not likely to be viewed, thereby allowing a user to quickly view necessary data.

In some embodiments, the retrieval scheme can be dynamically adjusted based on how the user interacts with the client device. For example, if the retrieval process senses that the user's interest has moved to a specific group(s) of messages, that group(s) of messages can be prioritized for retrieval. Such an updated retrieval system may be based on various use input. For example, a user may actively scroll through a display screen as e-mail messages are being downloaded and displayed, thereby indicating that the retrieval scheme needs dynamic updating to prioritize retrieval of messages being displayed in the updated view.

Some embodiments can further address a scenario where the synchronization process involves multiple mailboxes. In such a scenario, multiple threads of processes can operate in parallel, where the threads would typically compete for the same processing and memory resources, thereby slowing down retrieval for a mailbox most likely to be viewed first. To address this, a priority mailbox can be identified and a single retrieval process may operate initially for that mailbox, potentially using a prioritized retrieval for certain messages of the priority mailbox.

For example, a single thread can initially operate on one mailbox identified as a priority mailbox. Once the most important data from the priority mailbox is retrieved, multiple threads can operate in parallel to retrieve data from the other mailboxes and additional data from the priority mailbox, where each thread can retrieve data for a different mailbox. Although embodiments are described using an example of a mobile device interacting with an e-mail server, other devices can be used, and multiple message servers can be involved.

I. E-Mail Information to be Synchronized

One example of a ubiquitous protocol used in e-mail retrieval from a server is the Internet Message Access Protocol (IMAP). IMAP is an application layer protocol that allows an e-mail client to access e-mail on a remote server. IMAP allows multiple clients to simultaneously connect to the same mailbox, while integrating changes made to the mailbox at each client. Several of the disclosed methods and systems that follow may be equally applicable to other protocols for mail transfer, such as proprietary protocols provided by various private parties. Thus, IMAP is used as example of the type of data typically used for e-mails and other messages.

Under IMAP, messages in a mailbox are comprised of several types of data. One example is a Unique Identifier (UID) of a message. A UID corresponds to a sequential listing of messages. The UID is typically a 32-bit value that uniquely identifies a message in a mailbox. UIDs may be assigned in ascending order in a mailbox. UIDs are typically not changed across sessions. Different mailboxes can have the same UIDs.

A message can also have a set of one or more flags associated with it. A flag may indicate, for example, whether a message has been read, whether a message has been answered, or whether a message is a draft. A flag may remain the same or change across sessions.

A message may also comprise header data, such as information about a sender of the message and a receiver of the message. A header may comprise data regarding the sender and recipient of a message.

A message may also comprise content information. Several sub-types may broadly comprise message content. Two examples are text: referring to the textual portion of a message, and attachment: referring to any objects or other messages attached with the message. Although the four data types above will be discussed further in this application for simplicity, a message may comprise several other data types, or attributes, in addition to the four above, or overlapping with them.

The IMAP protocol can allow for retrieval of the various types of data separately for messages during the synchronization process. For example, the text and attachment data can be accessed separately from each other, and separately from UIDs, flags, and header data.

II. Synchronization of E-Mail Between Client and Server

Synchronization of e-mail between an e-mail server and a client can involves a series of communications between the server and the client. At the completion of the synchronization process, the client device may have downloaded various types of data for a plurality of messages from the server. Several triggers may initiate a synchronization process. For example, a user may turn on or off the client device, thereby triggering the synchronization event. A server-side synchronization notifications may also be used. A set of communications is now described for a general synchronization process.

A. Block Diagram

FIG. 1 is a block diagram illustrating an example synchronization process 100 between a client device 102 and an e-mail server 104 according to embodiments of the present invention. Synchronization process 100 can also be performed for other types of message servers besides e-mail servers. Blocks on the left correspond to actions performed by client device 102, and blocks on the right correspond to actions performed by e-mail server 104.

At block 105, client device 102 recognizes a trigger for synchronization. Such a trigger could be one of various types, such as the transition of client device 102 from a sleep state to a wake state. The transition could be accomplished, for example, through input by the user, or at a predetermined time of the day. Times for synchronization could be preset according to user preferences, or updated dynamically based on usage. Synchronization times may also be determined intelligently based upon various factors, such as the amount of activity in a given mailbox or account. For example, based on a user's calendar, if it is determined that the user returns from a meeting to view the e-mail messages at the same time every day, the synchronization process may begin prior to the expected time that the user views a mailbox. Other triggers can involve detecting movement in a pointing device (e.g., a mouse or a touchscreen) of the client device, or activation of a window on a screen of the client device.

As further examples, a synchronization process may be triggered when a user adds a new e-mail account on a client device. It also may be triggered when a user opens an e-mail application. As will be explained in later sections, in some implementations, synchronization notifications may also be used, for example, to 'push' notifications to the client device from a server upon occurrence of certain events, e.g., identification of a new message by another device of a user.

At block 110, client device 102 requests initial data from e-mail server 104. Initial data may comprise metadata, such as the total number of messages in the mailbox and the number of unread messages. This initial request can be made to obtain information for determining a retrieval scheme.

At block 115, e-mail server 104 can determine the requested count(s) of messages in the inbox. E-mail server 104 may determine the counts in various ways. For example, a count can be automatically maintained and stored by e-mail server 104, and thus simply retrieved from storage. As another example, e-mail server 104 can analyze the messages in the mailbox to determine the requested count (s), e.g., by counting a number of messages, and potentially counting a number of unread messages At block 120, e-mail server 104 can send the requested initial data back to client device 102. The requested initial data can be sent in one or more packs of data.

At block 125, the client device 102 determines a retrieval scheme. A retrieval scheme can involve dividing the messages to be synchronized into several groups and dividing the data within a group into several batches, e.g., based on data type. The retrieval scheme can be determined based on the initial data, e.g., a number of messages to include in a group of messages whose data is requested. Other factors can be used in addition or instead. For example, the retrieval scheme can be determined based on the number of messages that can be displayed on a single screen of client device 102, and based on movement of an indicator (e.g., a scroll bar), which can indicate which messages are being viewed in a viewable window of a message application.

At block 130, after determining the retrieval scheme, the client device sends a request for a first batch of data. The first batch of data can be determined based on the retrieval scheme. The first batch of data may comprise several data types for one or more messages. For example, the first batch of data may comprise UIDs and flags for a first group of messages.

At block 135, e-mail server 104 can retrieve the first batch of data. Different types of data may be stored separately. For example, the data of the messages may be stored in a table, with the UIDs in a particular field of the table. The data can be retrieved with a query to the database, e.g., by specifying a group of messages and the data types to be retrieved.

At block 140, the first batch of data is sent to client device 102. The first batch of data can be sent in one or more packets. Metadata can be sent to identify which data corresponds to which messages and what type certain data is.

At block 145, client device 102 determines a second batch of data based on the retrieval scheme. The second batch of data could be from a same group of messages as the first batch or from a different group of messages. The second batch can be for a same or different types of data as the first batch.

At block 150, the second batch of data can be request from e-mail server 104. The request for the second batch of data can use similar mechanisms as the request for the first batch. At block 155, the second batch of data is retrieved. At block 160, the second batch of data is sent to client device 102.

At block 165, client device repeats the identified of additional batches of data and the requests the data from e-mail server 104, which can then retrieve and provide the data. This process can be repeated until the synchronization is complete.

B. Retrieval by Data Types

As mentioned previously, retrieval of e-mail may occur by data type, alternatively referred to as an attribute of the message. Each e-mail message may be composed of various data types (attributes) such as a UID, a header, and a content, the content comprising a text and/or an attachment. Each of these data types can be retrieved separately. Batches of data may be retrieved in various sequences. Each retrieval step may operate on a different batch of data.

Figure 2:
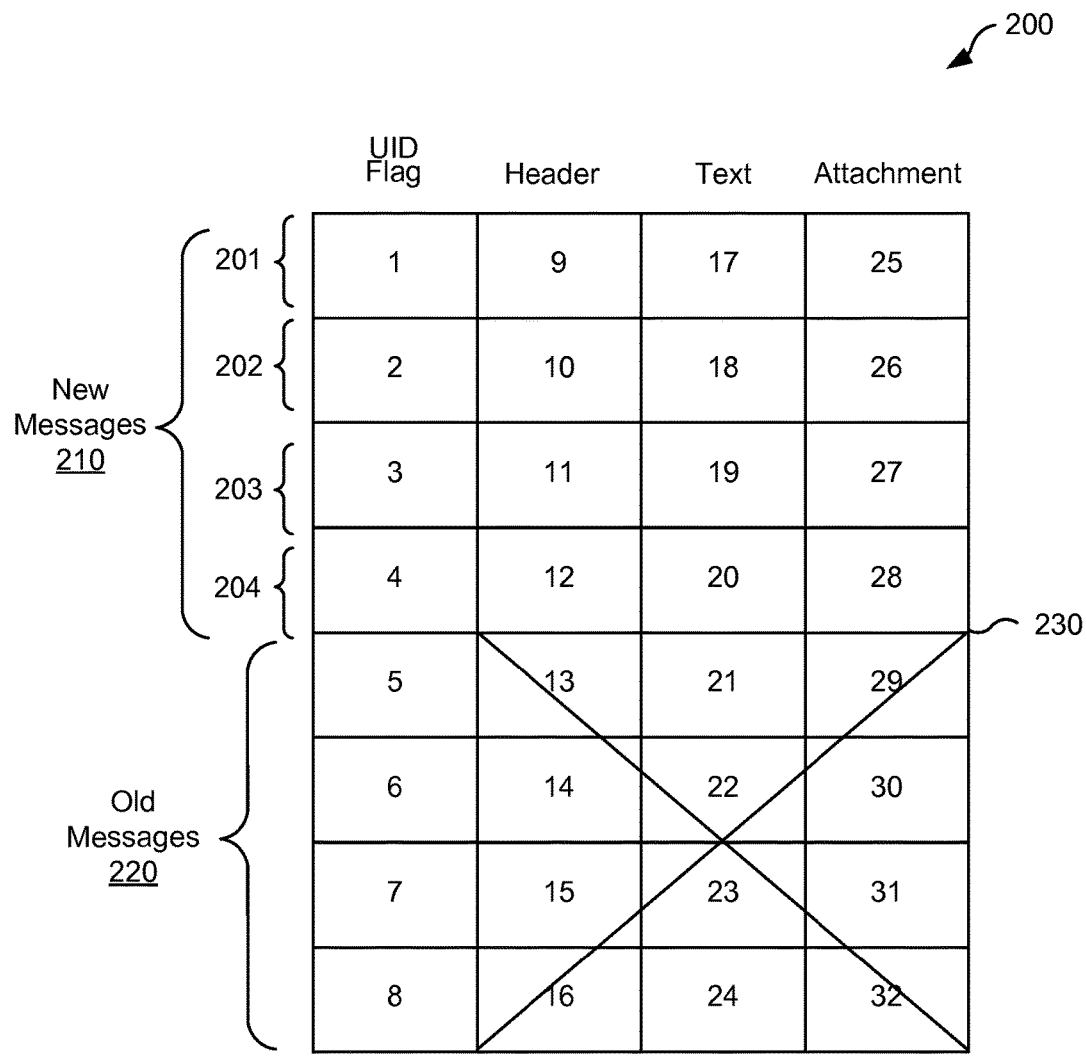
FIG. 2 is an illustration of an example retrieval sequence for retrieving data of messages that may be improved by embodiments of the present invention.

FIG. 2 is an illustration of an example retrieval sequence 200 for retrieving data of messages that may be improved by embodiments of the present invention. A set of new messages 210 and a set of old messages 220 correspond to all of the messages in the mailbox. New messages 220 are divided into several groups 201-204 of messages.

Numbers within a block refer to a request order for a batch of data. For example, the block numbered 1 corresponds to the first batch of data to be requested, and block 2 corresponds to the second batch of data to be requested. This ordering of the batches corresponds to a retrieval scheme, although one that can cause problems, as detailed below. Block 1 corresponds to a batch of N UIDs and flags corresponding to the N most recent messages in the mailbox, represented as group 201. N can be any integer greater than or equal to one.

According to block 1, the sequence of retrieval begins with the UIDs and flags of group 201. Thus, after the retrieval operation depicted by block 1, the client device has the UIDs and flags for group 201. But, such information is insufficient information for the messages of group 201 to be displayed on the client device.

At block 2, the retrieval continues with a request for a subsequent batch of UIDs and flags corresponding to message set 202. Subsequent requests may follow for other batches of UIDs and flags, indicated in the ordered blocks 3-8 in FIG. 2. This retrieval scheme focuses on obtaining the UIDs and the flags first. The UIDs and flags are obtained for old information as the UIDs can be used to ensure all messages are obtained and where to display. The flags can change over time, and thus synchronization of the flags can be done, even for old messages.

After block 8, all UIDs and flags have been retrieved for the messages in the mailbox. At this point, focus of synchronization moves to the next data type, which is header data.

At block 9, a batch of headers corresponding to messages of group 201 are requested. At the end of this retrieval operation, there may be some information to present to the user on a display of the client device. However, the information presented to the user could still be inadequate as there is no preview of the content of the messages in group 201.

At blocks 10-12, subsequent batches of headers may be requested and retrieved for groups 202-204 of new messages. In embodiments where a previous synchronization has been detected, the retrieval of headers may be completed at block 12, which marks the cut-off point UID Next.

A line 230 separates the last message that was downloaded successfully in a previous synchronization operation, namely the separation between old messages 220 and new messages 210. Once the retrieval process detects this cut-off point, for example through a flag, header and content data of old messages 220 may not need to be synchronized in the current synchronization process. A message server may implement this through a history counter that keeps track of how content has changed. The "X" across these block indicates that synchronization is not necessary if previous synchronization was completed. If synchronization is desired for old messages 220, headers for can be retrieved in retrieval blocks 13-16.

At block 17, a first batch of text content corresponding to message group 201 is requested. At the end of the retrieval, there may finally be enough information to display on the client device to satisfy the immediate need of the user. At the end of block 17, a user may start interacting with some of the messages in group 201. At blocks 18-20, text data can be retrieved for groups 202-204, and blocks 21-24 can be skipped. Any attachments exist can be retrieved at blocks 25-28, and blocks 29-32 can be optionally skipped.

III. Improved Ordering of Requests

The process illustrated by FIG. 2 may be optimized to provide better a user experience. A retrieval schemes may prioritize by message, so that certain data types of an initial group of messages can be retrieved before any data types of other groups of messages. And, certain data types can be retrieved using a single set of one or more retrieval requests, and the certain data types can be received together in a single batch of data. During the retrieval of a batch of data, each batch of may further be broken into smaller sub-batches (e.g., corresponding to a subgroup of messages). Such further subdivision may be dependent upon existing conditions, such as network bandwidth.

A. Example Retrieval Scheme

Figure 3:
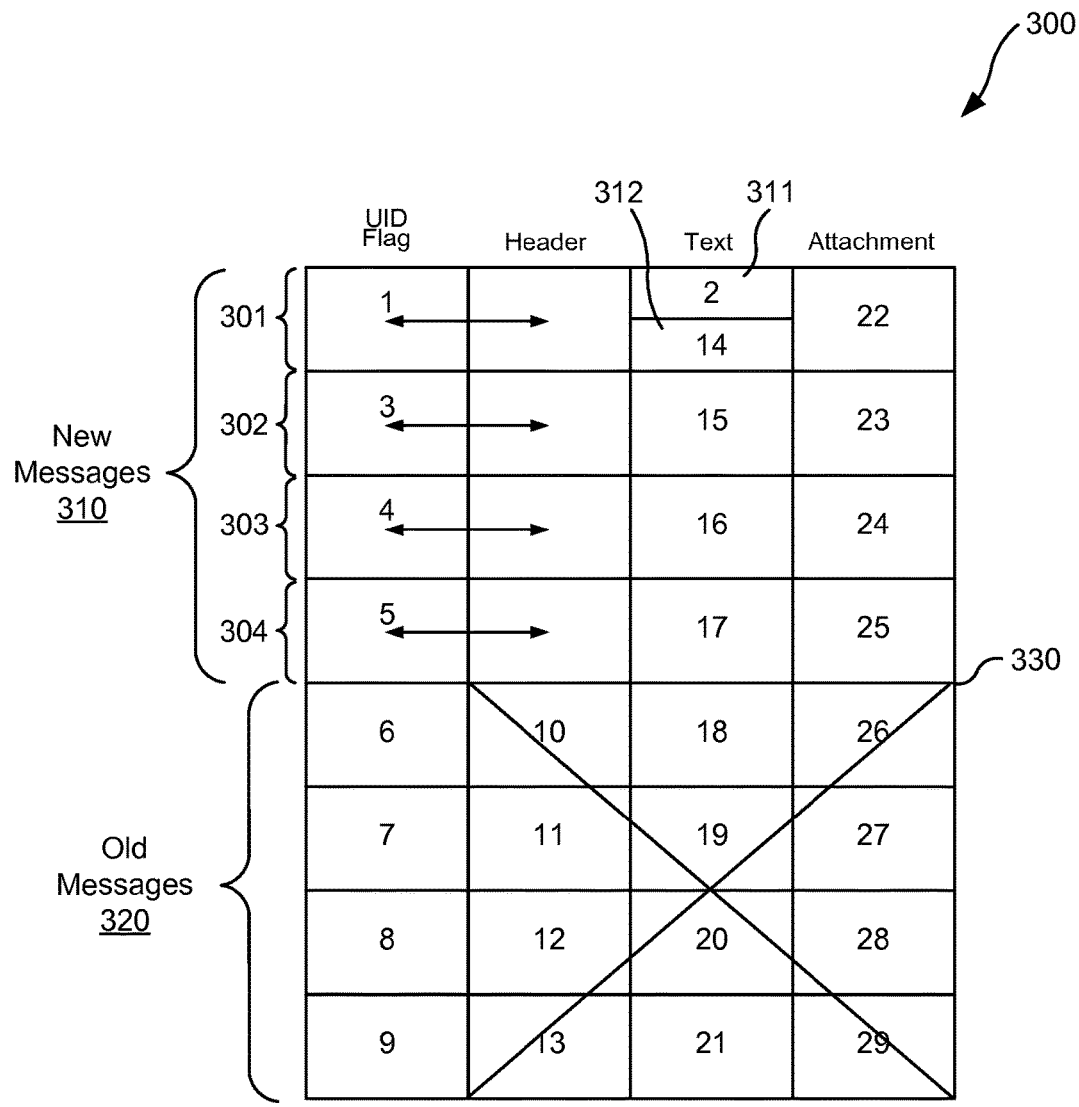
FIG. 3 is an illustration of an improved retrieval sequence for retrieving batches of different data types according to an embodiment of the invention.

FIG. 3 is an illustration of an improved retrieval sequence 300 for retrieving batches of different data types according to an embodiment of the invention. The mailbox for this examples includes new messages 310 and old messages 320. The new messages are divided into four groups 301-304 for this retrieval scheme. The retrieval operations are labeled with a specific order according to one embodiment.

In the first retrieval operation 1, a first batch of retrieved data includes the UIDs, flags, and headers corresponding to the message group 301. Message group 301 can comprises N messages. Groups 301-304 can each include a same number of messages, or a group can have a different number of messages than another group.

At retrieval operation 2, the second request is directed to a subgroup 311 of the message group 301. Group 302 comprises a subset (also called a subgroup) of M message of the N messages, where M<N. In the second request, a text data type is retrieved for message group 302. The number M may be pre-determined, or determined dynamically based on various criteria (factors) determined before the second request is made by the client device. For example, M may be determined based on the number of messages that can be displayed for a given screen resolution and/or orientation of the client device. M may be dynamically determined as a user changes the orientation of the client device from a portrait to a landscape mode. In other embodiments, M may equal N, and thus text data for all messages of group 301 can be requested in the second request.

In some implementations, a single retrieval operation may request UIDs, flags, headers, and text for a message group. Thus, retrieval operations 1 and 2 can be combined.

One advantage of the retrieval scheme depicted in FIG. 3 is that there may be sufficient information to provide useful, viewable information at the end of the second retrieval operation. Thus, a user can obtain a good user experience in a shorter amount of time and with fewer bytes of data transferred compared to FIG. 2. For example, at the end of retrieval operation 2, the user may be presented with a preview (snippets) of messages. At the end of retrieval operation 2, from a user's perspective, there may be an appearance that the entire synchronization is complete.

At retrieval operation 3, a third request is the next set of N UIDs, flags, and headers, specifically for message group 302. The number N of messages in group 302 may be the same or be different than message group 301. Retrieval operations 4 and 5 are for the UIDs, flags, and headers for message groups 303 and 304. A retrieval operation may include one or more individual requests for one or more data types for the retrieval operation. For example, retrieval operation 4 may include a request for UIDs, and a request for flags, and a request for headers. In other embodiments, a single request may be sent for all of these data types.

At retrieval operation 6, UIDs and flags of a group of old messages may be retrieved. The header information may not be retrieved since the header data would not have changed, and the old messages were previously synchronized. But, UIDs can be obtained to determine where to display the message (e.g., a relative order) and the flags may have changed. Retrieval operations 7-9 can obtain UIDs and flags of groups of other old messages.

Similar to FIG. 2, line 330 marks the cut-off point indicating that older messages were synchronized in an earlier operation. When line 330 is reached, beginning with request at retrieval operation 10 in FIG. 3, several data types may not be synchronized in some embodiments. Previously synchronized data is indicated by a region marked by X.

At retrieval operation 14, text data for the messages of group 301 that were not retrieved for group 301 (i.e., not part of subgroup 311). Subgroup 312 would be composed of N minus M messages, which could be zero if N equals M. Following retrieval operation, the synchronization can continue in a similar manner as in FIG. 2. In one embodiment, any remaining retrieval operations can be retrieve text and attachments in a same operation, and potentially be made for any subgroups of groups 302-304.

Accordingly, retrieval can be prioritized after dividing a set of messages to be retrieved into groups of messages. The size of such groups may be variable and based on various factors such as the total number of messages to be retrieved, network circumstances, and size of the client device's display.

Instead of using a history counter to determine which messages are old and which ones are new, a "hashing" system may be used to effectively determine the range of UIDs in which change has occurred. Under such a system, a client device may request a "hash" of all the UIDs and flags within a certain range. A hash is a function that provides a deterministic value based on an input, e.g., an input of data. If the data changes then the hash would change. Thus, a client device may have the opportunity to narrow the range of resynchronization using hashes for ranges. When the client device detects that a message has changed, the message can be resynchronized from the server.

B. Method for Synchronizing Messages

Figure 4:
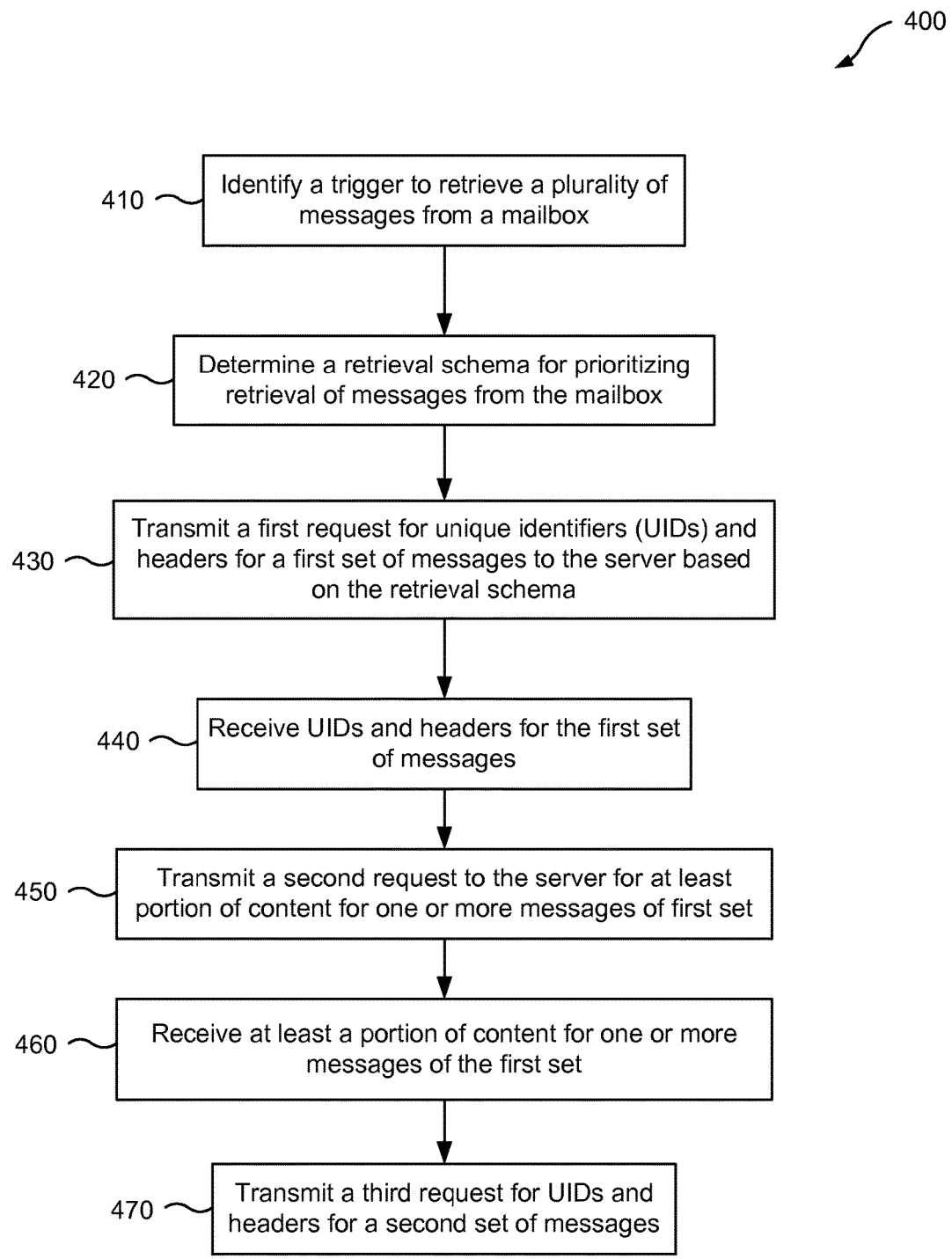
FIG. 4 is a flowchart of a method of prioritized retrieval of messages from a server to a client device according to embodiments of the present invention.

FIG. 4 is a flowchart of a method 400 of prioritized retrieval of messages from a server to a client device according to embodiments of the present invention. Method 400 can be performed by a client device, e.g., client device 102 discussed above for FIG. 1. Method 400 can prioritize which data to request first so that a user can access relevant message information quicker than is typically done.

At block 410, the client device identifies a trigger to retrieve a plurality of messages from a mailbox on the server. This trigger can be to start a synchronization process. Each of the plurality of messages in the mailbox can include a unique identifier, a header, and a content. The content may further comprise a text and/or an attachment.

As mentioned earlier, the trigger may be scheduled or may result from various events. For example, synchronization of e-mail may occur at various time intervals during the day, by default. This default option may be overridden by user-defined settings. Certain user input on the client device may also trigger a synchronization process. For example, a user launching a messaging application that is associated with the mailbox. Alternatively, or in addition, a trigger may originate from the e-mail server. Such synchronization notifications, including push notifications from the server will be explained below.

At block 420, the client device determines a retrieval scheme for prioritizing retrieval of portions of data for the plurality of messages. The retrieval scheme specifies different priorities for different sets of messages. In this manner, the multiple data types for some messages can be retrieved before any data types of other, less prioritized messages.

In some embodiments, the retrieval scheme is not static, and may be refined at various points during the synchronization process. The retrieval scheme can divide the plurality of messages to be retrieved into groups (sets) of messages. Each group can have a different priority for having corresponding data retrieved. Some groups can further be broken into subgroups (subsets), e.g., as shown in FIG. 3 for subgroups 311 and 312.

At block 430, the client device transmits a first request to the server based on the determined retrieval scheme. The first request requests at least the unique identifiers and the headers of a first set of the plurality of messages. The first set can include a request for other data types of the first set, e.g., for text of the messages of the first set and/or any associated flags. The first set includes more than one message and fewer messages than the plurality of messages in the mailbox. Requesting data for multiple messages at a time can reduce an amount of communications traffic just for requests, and data can be sent in larger batches.

At block 440, the client device receives, from the server, the UIDs and the headers for the first set of messages. The UIDs and headers can be received in one data packet or multiple data packets. The UIDs and the headers can be received in one data stream, e.g., as one communication operation sent by the server. The client device can use the UIDs to determine where the messages of the first set are to be displayed. A UID and a header for a particular can be received together in a same tuple of data, so that the client device knows the header corresponds to the particular UID. Any flags may also be received in such a tuple of data.

At block 450, the client device transmits a second request to the server. The second request is for at least a portion of the content for one or more of the messages of the first set. For example, the second request can be for a smaller subset of the messages, e.g., subgroup 311. The at least a portion can include text and/or attachments for the one or more messages of the first set. In some embodiments, the first request and the second request can be included in a single request message sent to the server.

At block 460, the client device receives, from the server, the at least a portion of the content for the one or more of the messages of the first set. The portion of the content may be displayed as a preview in a preview box or window in the messaging application (e.g., in a mail application). The portion of text received may be just the amount of the text for the preview box, and further text can be obtained later, or all of the text can be received at the same time.

At block 470, the client device transmits a third request to the server. The third request can be sent after receiving the UIDs and the headers of the first set and after receiving the at least a portion of the content for one or more of the messages of the first set. The third request can request the UIDs (and potentially the headers) of a second set of the plurality of messages. The second set of messages would have lower priority. For example, groups 302-304 of FIG. 3 have lower priority than the first set. In another example, the second set could also be a set of old messages, and thus the third request may only be for UIDs, and not include headers.

Before the second request is transmitted, a fourth request can be transmitted for the unique identifiers and the headers of a third set of the plurality of messages. For example, the UIDs and headers for message group (set) 302 may be requested before the text is requested for subgroup (subset) 311.

This process may be followed by several such similar iterations either until the synchronization of the mailbox is complete or until the process is interrupted by some event. For example, the synchronization may proceed as depicted in FIG. 3, depending on how many new and old messages there are, and the number of messages in a set. The retrieval can also be updated during the synchronization, as detailed below.

IV. Updating Retrieval Scheme

In some embodiments, the retrieval scheme may not be determined all at once, e.g., at block 420. For example, before each request is sent, a determination can be made as to what data types and which messages should be included in the next request. In this manner, changes to the synchronization can be made, e.g., when a user provides input suggesting that certain messages are higher priority than was originally determined, as may occur when a user scrolls down to see older messages. And, even if an entire scheme is determined at block 420, various events may lead to the retrieval scheme being updated.

The client device, the e-mail server, or both can continually evaluate the status of the synchronization process and determine priority based on a number of factors. For example, the client device may continually track the information that is being displayed in a window of the client device.

If, at some point during the synchronization, the user scrolls through the messages being displayed as more messages are being retrieved, the retrieval scheme may be updated dynamically. For example, if during the retrieval data for a third set of messages, the user scrolls the screen to such an extent that the user would be viewing a sixth set of messages, the sixth set of messages can be prioritized highest for retrieval. In particular, the text content, or snippets, of the messages for the sixth set of messages may be prioritized for retrieval. Displaying snippets from the sixth set of messages as the user browses that section may give the appearance that entire messages were downloaded.

The retrieval scheme may also be updated at various predetermined points. For example, the retrieval scheme may be revaluated every few seconds. Alternatively, the retrieval scheme may be revaluated every time a user input is sensed on the client device.

The updating need not be limited to the order of the messages. In another example of dynamically updating the retrieval scheme, the retrieval scheme may be redefined to distribute work across multiple threads running simultaneously. Further, other activities may take priority during the synchronization depending on user interaction. For example, if a user clicks on a new message while the synchronization process is ongoing, several other processes, such as updating a status flag may take highest precedence.

V. Implementation for Multiple E-Mail Accounts

Although the previous embodiments were described without reference to the number of mailboxes, a synchronization process may involve multiple mailboxes at the client device. The term 'mailbox' is used broadly in this context, and may refer to, for example, mailbox as used in the context of the IMAP protocol may refer to a folder. As another example, mailbox may refer to a specific e-mail account or other type of messaging account. The user may have one or more accounts, and hence mailboxes, associated with each e-mail service provider.

When multiple mailboxes need to be synchronized, the retrieval scheme prioritization may account for priorities of various mailboxes. In addition, several parallel processing threads may run simultaneously during the synchronization process. Various threads can operate on distinct mailboxes at a given instant in time and run in parallel, but compete for the same processor resources. Hence, it can become important to prioritize mailboxes.

A. Simultaneous Threads Retrieving by Data Type

Figure 5:
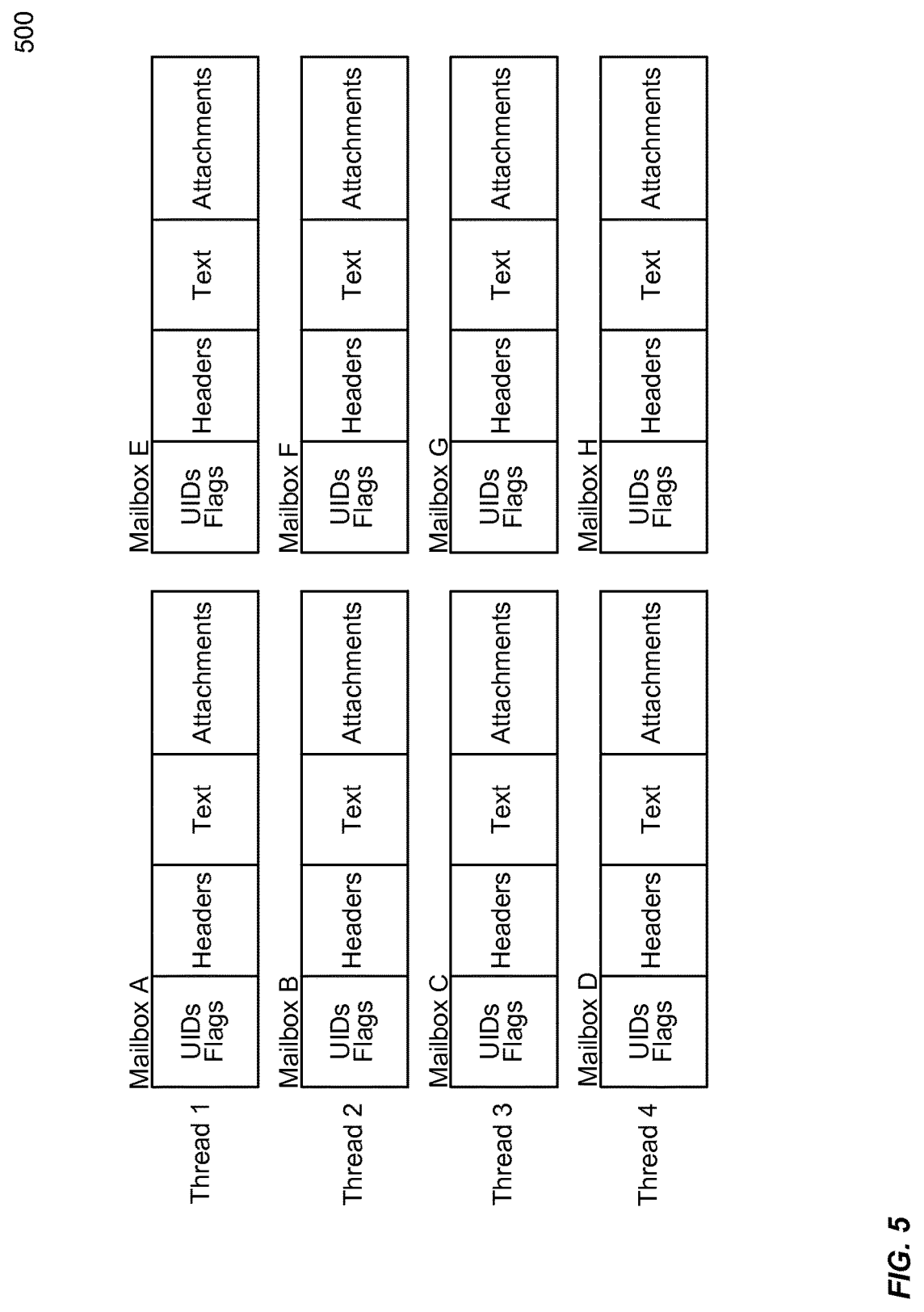

FIG. 5 shows one example of a retrieval scheme 500 in a multiple mailbox scenario that may be improved by embodiments of the present invention. Retrieval scheme 500 has eight mailboxes (A-H) that are to be synchronized. In FIG. 5, four threads (1, 2, 3, and 4) run simultaneously initially acting on four mailboxes: A, B, C, and D in parallel. This is followed by mailboxes (E-H). Messages for each mailbox may be retrieved from the same server or from different servers.

Within each mailbox, according to retrieval scheme 500, each thread goes through the mailbox in its entirety before moving on to the next mailbox. For example, in FIG. 4, thread 1 would complete retrieval of mailbox A before moving on to mailbox E.

Within a mailbox, as illustrated in the figure, each data type is retrieved in series. In the example illustrated in FIG. 5, all the UIDs and flags are requested and retrieved first, then headers, text content, and finally attachment content, as in FIG. 2. A retrieval scheme according to FIG. 3 could be used. But, even then, the threads could compete for resources, thereby slowing down the retrieval of the data for the first messages that the user may wish to view. Accordingly, embodiment can prioritize retrieval for certain mailboxes.

B. Improved Retrieval

1. Parallelization

According to some embodiments in a multiple-mailbox situation, a highest priority mailbox can be determined. The highest priority mailbox can be an Inbox of a message account, or a message account relative to other message accounts.

Figure 6:
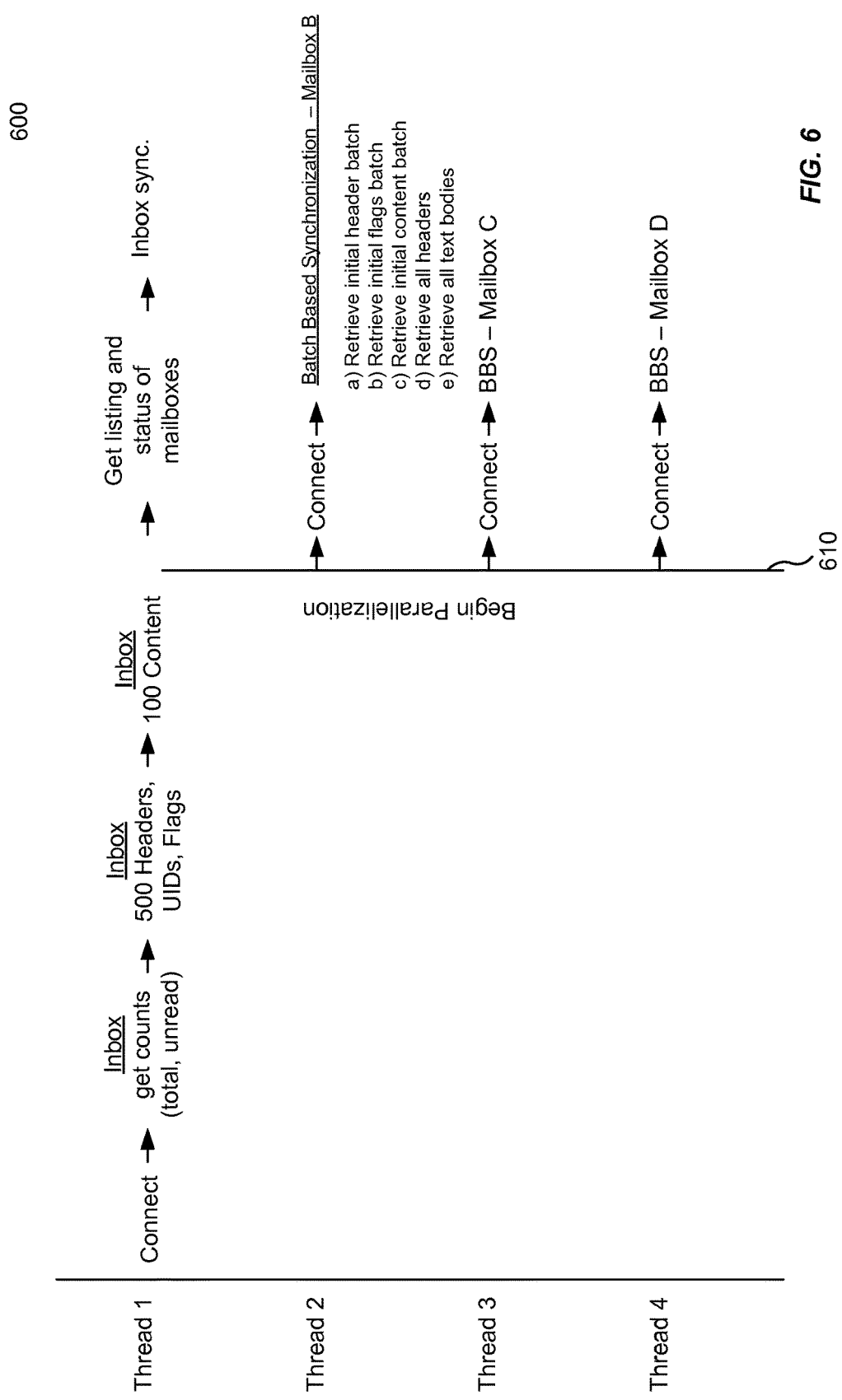
FIG. 6 shows an improved retrieval scheme for multiple mailbox synchronization according to embodiments of the present invention.

FIG. 6 shows an improved retrieval scheme 600 for multiple mailbox synchronization according to embodiments of the present invention. Once the highest priority mailbox is determined, the highest priority is to retrieve initial data form that mailbox. In FIG. 6, the highest priority mailbox is labeled as the Inbox, which may be for a mail account that different than the other mailboxes B-D. After a connection is made to the corresponding server for the highest priority mailbox, high-level statistics about the mailbox may be retrieved, such as the count of total number of messages and the number of unread messages in the highest priority mailbox In FIG. 6, only thread is operational until several synchronization steps are complete for the highest priority mailbox. For example, thread 1 is the only operational thread while the total count of messages, and total count of unread messages are retrieved for the Inbox. This is followed by a retrieval step targeting, UIDs, headers, and flags of a first set of messages (e.g., 500 messages). A next retrieval can be for content of a subset of the messages (e.g., for 100 of the messages). A portion of the content (e.g., only text or portion of the text) may be retrieved.

The number of data types to retrieve in any step may change dynamically based on several factors, such as the immediate need of the user. During these steps, there can be resource preservation at an application level, because there are no other tasks are scheduled until the highest priority work in the Inbox is complete. All system resources can be dedicated towards those tasks.

Once the highest priority tasks (e.g., retrieval operation 1 and 2 of FIG. 3) are complete for the highest priority mailbox, a listing of all mailboxes to be synchronized can be determined, as indicated by line 610. The retrieval scheme can trigger multiple threads, e.g., one thread for each mailbox to be synchronized. The other threads can implement a batch-based synchronization, e.g., as described in FIG. 3 and variants thereof.

In the example shown in FIG. 6, four parallel threads operate on four different mailboxes, with thread 1 continuing to operate on the Inbox, and threads 2-4 operating on mailbox B-D respectively. However, each thread does not have to necessarily correspond to one mailbox. Besides, priorities can be altered depending on the priority of the task for the user. For example, if the user clicks on a mailbox making it active, all synchronization of the content in that mailbox may receive the highest priority.

Once the parallelization is started, synchronization of each mailbox may follow several schemes, such as scheme described in sections II.A. and II.B. above. In FIG. 6, one example is illustrated with reference to Mailbox B, from steps a) through e). In Mailbox B, under the example illustrated, an initial batch of headers, flags, and content is prioritized for retrieval, and then headers and text bodies for other messages can be retrieved. In one embodiment, attachments are retrieved only in response to a user requesting an attachment, e.g., by a user opening an attachment.

2. Priority Mailbox

As described above, an Inbox of a primary mail account can often be the highest priority mailbox for a user. However, several approaches may be used to determine which mailbox would be prioritized over others in a multiple mailbox scenario. Similarly, mailboxes can also be ranked in order of priority for synchronization. Prioritization of a mailbox can become critical, for example, in a scenario where the connection to the internet or similar network may be slow or unreliable.

The decision on which mailbox to prioritize may be based on the time of the day. A work e-mail accounts may be prioritized over personal e-mail accounts during work hours on weekdays. Location may also be used determine priority. If a user attempts to synchronize multiple mailboxes at a location that the device determines as a work location, a work-related mailbox may be prioritized. On the other hand, while synchronizing from home, a personal mailbox may be prioritized. Another method of determining priority may be based on usage. Most heavily used mailboxes may be prioritized over mailboxes that are seldom accessed. Thus, the determination of a prioritized mailbox can be based on historical usage of the mailbox relative to other mailboxes.

VI. Monitoring E-Mail Updates Via Second Device

A. Synchronization Notifications

Typically, an e-mail synchronization process is initiated at a client device. A practical implication of this is that as soon as an e-mail arrives at a mail server, it does not appear on a client device. For example, a personal e-mail account may check for new e-mail messages every 15 minutes or so, thereby delaying the retrieval of a new message by up to 15 minutes. One way to solve this limitation is through "push" notifications. With push notifications, an e-mail is "pushed" from a server to a client device as soon as the server receives the e-mail.

Most mail servers do not support an efficient push mail unless a connection (such as a Transmission Control Protocol TCP) between the client device and the server is always open. However, an open connection is expensive and requires significant power, making it impractical for mobile devices that are powered by a limited battery.

Figure 7:
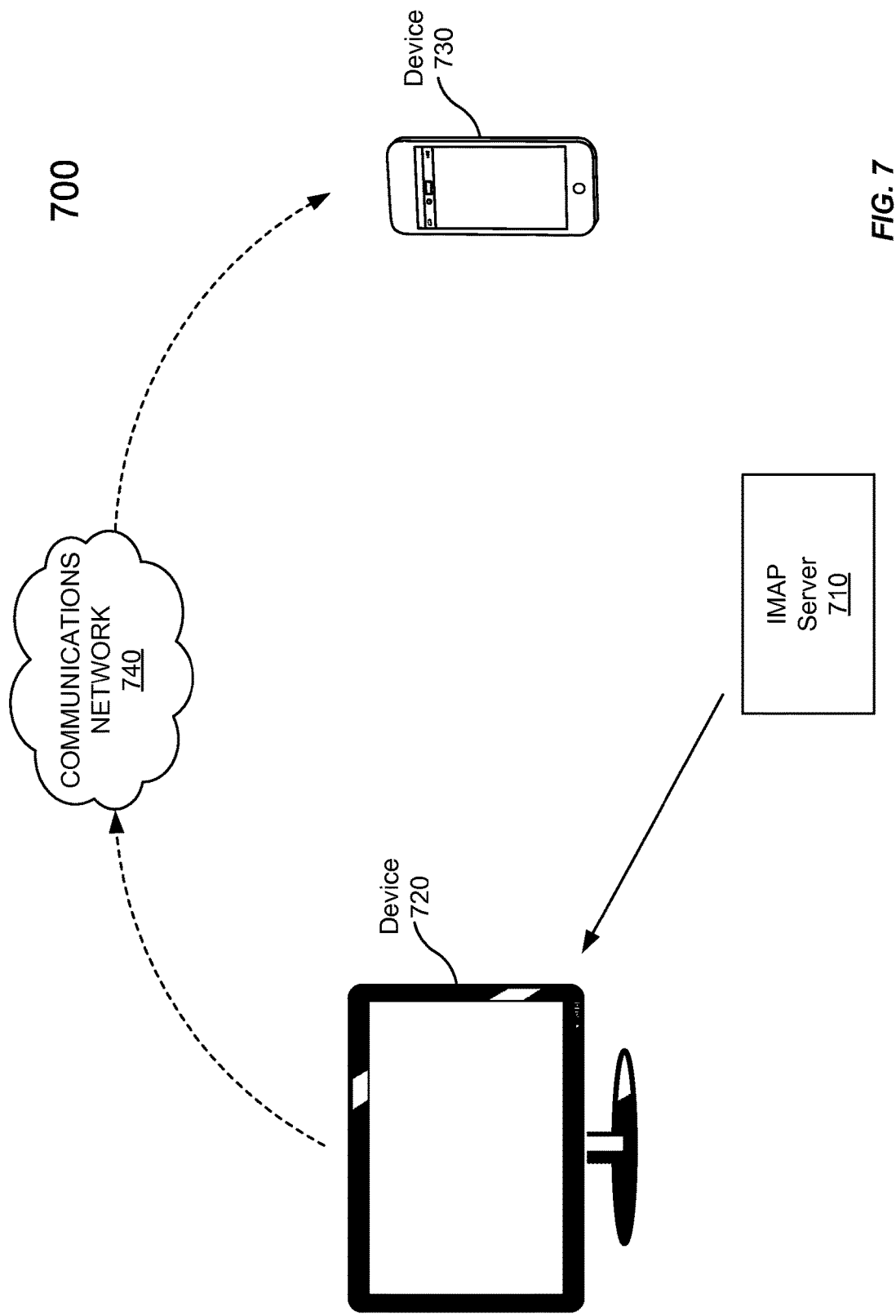
FIG. 7 illustrates an example of a personal device network comprising an IMAP server, a powered device, a mobile device, and a communication network ("cloud") according to embodiments of the present invention

FIG. 7 illustrates an example of a personal device network 700 comprising an IMAP server 710, a powered device 720, a mobile device 730, and a communications network 740 (e.g., a cloud network) according to embodiments of the present invention. In FIG. 7, powered device 720 may be powered by a constant power supply from a power-line or by a high capacity battery. Mobile device 730 may be powered by a limited battery. Thus, powered device 720 is in a higher power state than mobile device 730, and perform tasks as a result of this higher power state. In the example illustrated, device 720 is connected to an IMAP server 710 through an open connection.

Communications network 740 has mechanisms for power efficient pushes to devices that are registered with the network. The power efficient pushes are more efficient compared to a situation where every device has an open connection with server 710. A more power efficient push notification can be achieved, for example, by utilizing a single push daemon instead of several open connections.

As it can be power inefficient for mobile devices, such as mobile device 730, to maintain a persistent connection with the IMAP server 710 in order to receive push content from a specified set of providers, the "online" presence of mobile device 730 can be asserted using companion devices such as device 720 (acting as proxy devices). In various embodiments, mobile device 730 initially registers to have push content delivered. Communications network 740 can map mobile device 730 to connections made between powered device 720 and IMAP server 710 upon receiving assertions of presence from the mobile device 730. The IMAP server can forward the push content to device 720 instructing it to deliver the push content to mobile device 730.

This way, mobile device 730 would not have to expend valuable resources, including battery power, to initiate a synchronization process. If for some reason, powered device 720 goes offline, for example when it is powered off or loses a network connection, mobile device 730 would get notified that it would start having to initiate periodic synchronization events again. More detail surrounding this concept has been disclosed in U.S. patent application Ser. No. 14/475,060 entitled "Proxied Push" and is incorporated here by reference.

Accordingly, powered device 720 can provide a notification of one or more new messages to communications network 740. The notification can include data (e.g., UID, header, and/or text) for the one or more new messages and indicate that communications network 740 should push the data for the one or more new messages to mobile device 730 of a user of the powered device 720. Powered device 720 and mobile device 730 can both be registered with communications network 740.

B. Sharing Resources

The synchronization process may take advantage of more than one device, and more than one type of network connection. For example in a given environment, available connections may be WiFi, Bluetooth, wired LAN, and available devices may be a mobile phone, laptops, desktops, and tablet computers. A user may have the same mailbox set up in multiple devices.

In some embodiments, a first device can synchronize a mailbox with an message server over a first network. Subsequently, a second device may retrieve messages from the first device over a second network connection (e.g., via Bluetooth or WiFi) thereby synchronizing a mailbox.

For example, a user may be at a hotel with a slow WiFi connection representing the first network. The user may download several messages using the WiFi connection to a laptop. Subsequently, the user may want to synchronize the mailbox in a handheld device such as a mobile phone. However, downloading the messages again through the WiFi connection may be slow and inefficient. The second synchronization may utilize a more local Bluetooth connection between the laptop and the mobile phone, and synchronize the mobile phone from the laptop, rather than directly from the e-mail server.

The first device can act like a server to the second device, e.g., after the first device obtained the messages using a prioritized scheme, as described herein. For example, the first device can send data for the plurality of messages to a second device over a second network that is different from the first network. The sending can be in response to prioritized requests for unique identifiers, headers, and content of specified sets of messages from the second device before request for unique identifiers of other sets of messages.

VII. Example Device

Figure 8:
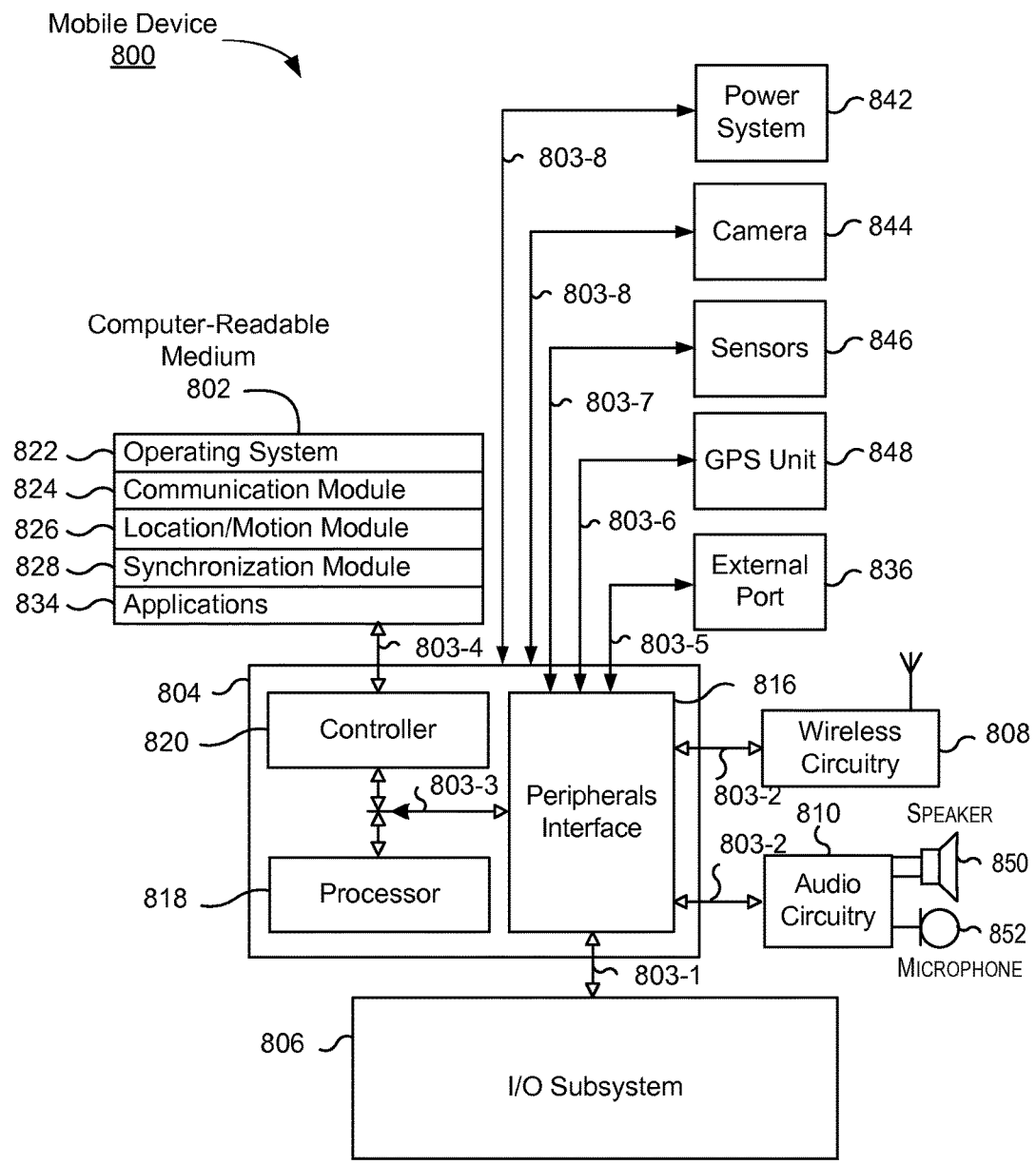
FIG. 8 is a block diagram of an example device.

FIG. 8 is a block diagram of an example device 800, which may be a mobile device. Device 800 generally includes computer-readable medium 802, a processing system 804, an Input/Output (I/O) subsystem 806, wireless circuitry 808, and audio circuitry 810 including speaker 850 and microphone 852. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein.

Wireless circuitry 808 is coupled to processing system 804 via peripherals interface 816. Interface 16 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of the device to processor 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory and secondary memory.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module (or set of instructions) 824, a location module (or set of instructions) 826, a synchronization module 828, and other applications (or set of instructions) 834, such as a car locator app and a navigation app. Synchronization module 828 can perform message synchronization with a server, as described herein.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifier) and motion of device 800. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The one or more applications 834 on the mobile device can include any applications installed on the device 800, including without limitation, a browser, address book, contact list, e-mail, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The timer module can maintain various timers for any number of events.

The I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or track pad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A computer-implemented method of retrieving messages from a server to a client device, the method comprising, at the client device:
   identifying a trigger to retrieve a plurality of messages from a mailbox on the server, wherein each of the plurality of messages in the mailbox includes a plurality of data types comprising a unique identifier, a header, and a content, the unique identifier being distinct from header data included in the header;
   determining a retrieval scheme for:
      prioritizing retrieval of particular portions of data for the plurality of messages with respect to other portions of the data; and
      specifying different priorities for different sets of messages based on the plurality of data types;
   transmitting a first request to the server based on the retrieval scheme, the first request requesting retrieval of at least the unique identifiers and the headers of a first set of the plurality of messages without retrieving the content of the first set, the first set including more than one message and fewer messages than the plurality of messages in the mailbox;
   receiving, from the server, the unique identifiers and the headers of the first set;
   transmitting, based on the retrieval scheme, a second request to the server, the second request for at least a portion of the content for one or more of the messages of the first set;

receiving, from the server, the at least a portion of the content for the one or more of the messages of the first set; and after receiving the unique identifiers and the headers of the first set and after receiving the at least a portion of the content for the one or more of the messages of the first set:

transmitting, based on the retrieval scheme, a third request to the server, the third request requesting the unique identifiers of a second set of the plurality of messages, wherein identifying the trigger comprises receiving a user input, and wherein determining the retrieval scheme, transmitting the first request, transmitting the second request, and transmitting the third request are performed independent of additional user input.

2. The method of claim 1, wherein the third request also requests the headers of the second set of messages, and wherein the second set of messages are new relative to a previous synchronization involving the client device and the server.

3. The method of claim 1, wherein the one or more of the messages of the first set form a subset of the first set, wherein the subset is smaller than the first set, and wherein the at least a portion of the content corresponds to text.

4. The method of claim 1, further comprising, at the client device:

transmitting, to the server, a fourth request for the unique identifiers and the headers of a third set of the plurality of messages, the fourth request transmitted before the second request is transmitted.

5. The method of claim 4, wherein the retrieval scheme originally specifies that the second request is to be transmitted before the fourth request, the method further comprising, at the client device:

receiving a different user input regarding a viewable window of a message application for viewing the plurality of messages; and determining that the fourth request is to be transmitted before the second request based on the different user input.

6. The method of claim 1, wherein the trigger is based on a transition of the client device from a sleep state to a wake state.

7. The method of claim 1, wherein the first set of the plurality of messages corresponds to a set of N messages that are most recent.

8. The method of claim 1, wherein the first request to the server also requests any flags of messages in the first set.

9. The method of claim 1, wherein data of the plurality of messages are retrieved over a first network, the method further comprising, at the client device:

sending data for the plurality of messages to a second device over a second network that is different from the first network, wherein the client device responds to prioritized requests for unique identifiers, headers, and content of specified sets of messages from the second device before request for unique identifiers of other sets of messages.

10. The method of claim 1, wherein data of the plurality of messages are retrieved over a first network, the method further comprising, at the client device:

providing a notification of one or more new messages to a communications network, the notification including data for the one or more new messages and indicating that the communications network should push the data for the one or more new messages to another device of a user of the client device.

11. The method of claim 1, wherein the first request and second request are sent using a first thread operating on the client device, the method further comprising, at the client device:

after transmitting the first request and second request, starting a use of one or more other threads to request data for messages of other mailboxes.

12. The method of claim 11, further comprising, at the client device:

determining the mailbox is a prioritized mailbox from a list of mailboxes, wherein the determining is based on historical usage of the mailbox relative to the other mailboxes.

13. The method of claim 1, wherein prioritizing retrieval of particular portions of data for the plurality of messages with respect to other portions of the data comprises requesting retrieval of the header data of the first set of messages before requesting retrieval of the content for the first set of messages.

14. A computer product comprising a non-transitory computer readable medium storing a plurality of instructions, that when executed control a client device to retrieve messages from a server, the instructions comprising:

identifying a trigger to retrieve a plurality of messages from a mailbox on the server, wherein each of the plurality of messages in the mailbox includes a plurality of data types comprising a unique identifier, a header, and a content, the unique identifier being distinct from header data included in the header;

determining a retrieval scheme for:

prioritizing retrieval of particular portions of data for the plurality of messages with respect to other portions of the data; and specifying different priorities for different sets of messages based on the plurality of data types;

transmitting a first request to the server based on the retrieval scheme, the first request requesting retrieval of at least the unique identifiers and the headers of a first set of the plurality of messages without retrieving content of the first set, the first set including more than one message and fewer messages than the plurality of messages in the mailbox;

receiving, from the server, the unique identifiers and the headers of the first set;

transmitting, based on the retrieval scheme, a second request to the server, the second request for at least a portion of the content for one or more of the messages of the first set;

receiving, from the server, the at least a portion of the content for the one or more of the messages of the first set; and after receiving the unique identifiers and the headers of the first set and after receiving the at least a portion of the content for the one or more of the messages of the first set:

transmitting, based on the retrieval scheme, a third request to the server, the third request requesting the unique identifiers of a second set of the plurality of messages, wherein identifying the trigger comprises receiving a user input, and wherein determining the retrieval scheme, transmitting the first request, transmitting the second request, and transmitting the third request are performed independent of additional user input.

15. The computer product of claim 14, wherein the first request and second request are sent using a first thread operating on the client device, wherein the instructions further comprise:
  after transmitting the first request and second request, starting a use of one or more other threads to request data for messages of other mailboxes.

16. The computer product of claim 14, wherein the instructions further comprise:
  transmitting, to the server, a fourth request for the unique identifiers and the headers of a third set of the plurality of messages, the fourth request transmitted before the second request is transmitted, wherein the retrieval scheme originally specifies that the second request is to be transmitted before the fourth request;
  receiving a different user input regarding a viewable window of a message application for viewing the plurality of messages; and
  determining that the fourth request is to be transmitted before the second request based on the different user input.

17. A client device for retrieving messages from a server, the client device comprising:
  one or more processors configured to:
    identify a trigger to retrieve a plurality of messages from a mailbox on the server, wherein each of the plurality of messages in the mailbox includes a plurality of data types comprising a unique identifier, a header, and a content, the unique identifier being distinct from header data included in the header;
    determine a retrieval scheme for:
      prioritizing retrieval of particular portions of data for the plurality of messages with respect to other portions of the data; and
      specifying different priorities for different sets of messages based on the plurality of data types;
    transmit a first request to the server based on the retrieval scheme, the first request requesting retrieval of at least the unique identifiers and the headers of a first set of the plurality of messages without retrieving the content of the first set, the first set including more than one message and fewer messages than the plurality of messages in the mailbox;
    receive, from the server, the unique identifiers and the headers of the first set;
    transmit, based on the retrieval scheme, a second request to the server, the second request for at least a portion of the content for one or more of the messages of the first set;
    receive, from the server, the at least a portion of the content for the one or more of the messages of the first set; and
    after receiving the unique identifiers and the headers of the first set and after receiving the at least a portion of the content for the one or more of the messages of the first set:
      transmit, based on the retrieval scheme, a third request to the server, the third request requesting the unique identifiers of a second set of the plurality of messages,
    wherein identifying the trigger comprises receiving a user input, and wherein determining the retrieval scheme, transmitting the first request, transmitting the second request, and transmitting the third request are performed independent of additional user input.

18. The client device of claim 17, wherein the one or more processors are further configured to:
  transmit, to the server, a fourth request for the unique identifiers and the headers of a third set of the plurality of messages, the fourth request transmitted before the second request is transmitted,
  wherein the retrieval scheme originally specifies that the second request is to be transmitted before the fourth request, wherein the one or more processors are further configured to:
  receive a different user input regarding a viewable window of a message application for viewing the plurality of messages; and
  determine that the fourth request is to be transmitted before the second request based on the different user input.

19. The client device of claim 17, wherein the first request and second request are sent using a first thread operating on the client device, wherein the one or more processors are further configured to:
  after transmitting the first request and second request, start a use of one or more other threads to request data for messages of other mailboxes.

* * * * *